Oct. 18, 1955     O. MITCHELL     2,720,892
O-RING MOUNTING CONSTRUCTION
Filed Dec. 20, 1951
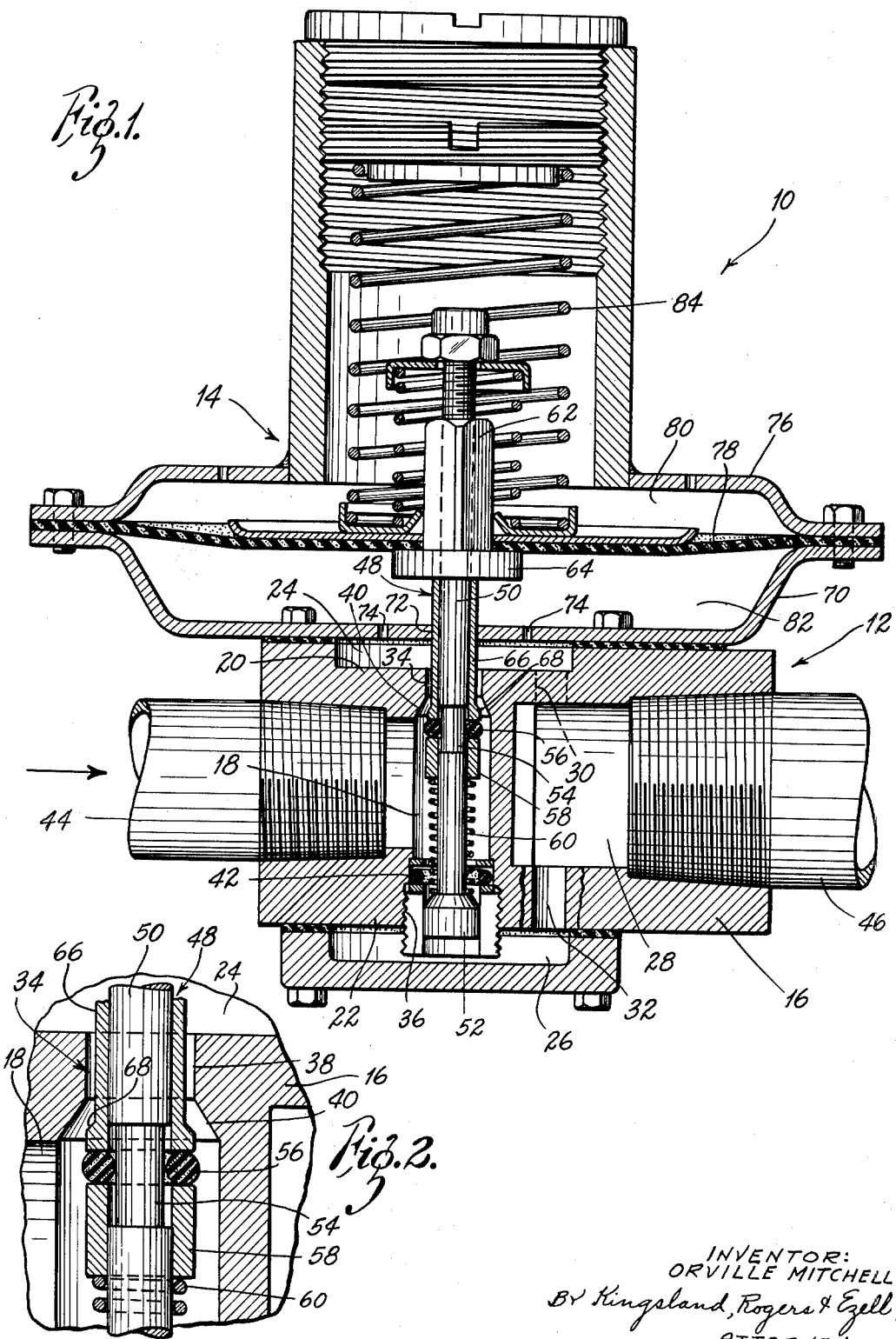
INVENTOR:
ORVILLE MITCHELL
BY Kingsland, Rogers & Ezell
ATTORNEYS ered Oct. 18, 1955

2,720,892

O-RING MOUNTING CONSTRUCTION

Orville Mitchell, Dallas, Tex., assignor to John E. Mitchell Company, Dallas, Tex., a corporation of Missouri Application December 20, 1951, Serial No. 262,515

8 Claims. (Cl. 137—625.34)

The present invention relates generally to a balanced pressure regulator employing O-rings as parts of the valve seats thereof, and more particularly to novel mounting construction for one of the O-rings.

This is an improvement over the mounting means for one of the O-rings shown and described in my co-pending application for Balanced Pressure Regulator, Serial No. 226,117, filed May 14, 1951.

In those known valve constructions wherein an O-ring is carried by a grooved member formed on a valve stem, it is necessary that the O-ring be stretched a considerable amount when placing it in position in the groove. This is very undesirable both from the standpoint of possible injury to the O-ring, and because of the difficulty in performing this operation in the assembly of the device, particularly when the O-rings used are quite small in size.

Furthermore, when the inlet pressure is low in a balanced pressure regulator employing O-rings, and the size of the various parts are such that one of the valves seats before the other one does, there might be instances when one of the O-rings fails to seat because of the frictional resistance between the other or seated O-ring and the wall of its valve seat.

It is an object of the present invention therefore, to provide a novel O-ring mounting construction in which the O-ring can be easily and quickly slipped onto its supporting member without having to stretch it more than a very slight amount. More particularly it is an object to provide such a construction wherein the maximum diameter of the supporting member is substantially the same size as the inside diameter of the O-ring so that the latter can be easily and quickly slipped thereon without undue stretching of the O-ring.

Another object is to provide a novel O-ring mounting construction in which the O-ring can move a limited distance in one direction relative to its supporting member so as to compensate for the differences in the dimensions of the various valve parts which prevents both valves from seating simultaneously. More particularly it is an object to provide such a construction in which the O-ring is mounted for limited axial movement relative to its supporting member and the other valve element carried by the supporting member, so that both valves can be closed at the same time regardless of slight differences in the distances between the valve elements and the distance between the valve ports.

Another object is to provide a novel O-ring mounting construction which includes means for automatically distending the O-ring laterally to compensate for large machining tolerances. More particularly it is an object to provide such a construction in which limited axial pressure is applied to one of the O-rings to cause it to expand laterally and thereby more effectively fill the space between its supporting member and the wall of its valve port to compensate for large machining tolerances.

As previously mentioned, the present invention pertains to the mounting construction for one of the O-rings in a balanced pressure regulator which includes a rod-like valve stem containing an enlarged valve element adjacent one end thereof for cooperation with one of the valve ports of the device. An O-ring is mounted on the valve stem in spaced relationship with the valve element for cooperation with the other valve port, and the diameter of the valve stem from the end opposite to the valve element, up to at least the O-ring, is substantially the same as the inside diameter of the O-ring so that the latter can be slipped onto the valve stem without any appreciable distortion or stretching of it. A spring biased follower is slidably mounted on the valve stem below the O-ring and bears against the underside of the O-ring to urge it upwardly in the direction of its valve port, and a sleeve is removably mounted on the valve stem in a predetermined position on the other side of the O-ring so as to positively limit its movement in that direction. In its preferred form, the valve stem is of substantially uniform cross-section throughout its entire length with the exception of the valve element at the one end thereof, so that the follower and sleeve have the same inside diameter and are very easily and quickly slipped into place on the valve stem during the assembly of the device.

In the drawings:

Fig. 1 is a vertical diametrical sectional view of a balanced pressure regulator embodying the teachings of the present invention, some of the parts being shown in elevation to better illustrate its construction, and Fig. 2 is an enlarged fragmentary view of the upper O-ring mounting construction, which is the principal subject-matter of the present invention.

Referring to the drawing more particularly by reference numerals, 10 indicates generally a balanced pressure regulator which includes a valve assembly 12 and a diaphragm assembly 14.

The valve assembly 12 includes a valve body 16 which has an inlet or high pressure chamber 18 separated by partitions 20 and 22 from an upper chamber 24 and a lower chamber 26, respectively.

The upper chamber 24 and the lower chamber 26 are connected to an outlet chamber 28 by passageways 30 and 32, respectively.

The partitions 20 and 22 contain opposed valve ports 34 and 36, the port 34 providing a connection between the inlet chamber 18 and the upper chamber 24 and the port 36 providing a connection between the inlet chamber 18 and the lower chamber 26.

The upper valve port 34 contains a vertical side wall portion 38 and a tapered side wall portion 40. The lower valve port 36 supports an O-ring 42 and assembly, all as more particularly described in my co-pending application, Serial No. 226,117, filed May 14, 1951.

An inlet conduit 44 is threadedly connected to the valve body 16 in communication with the inlet chamber 18, and an outlet conduit 46 is threadedly connected at the outlet chamber 28.

A valve stem assembly 48 is positioned within the valve body 16 and includes an elongated rod-like valve stem 50, the upper end of which extends up into the diaphragm assembly 14.

Formed on the bottom of the valve stem 50 is an enlarged valve element 52 which cooperates with the lower O-ring 42 in the conventional manner.

The part of the valve stem 50 immediately adjacent the upper valve port 34 contains a portion 54 of slightly reduced diameter (Fig. 2) which receives an upper O-ring 56. It will be noted that the reduced portion 54 is only slightly smaller in diameter than the main part of the valve stem 50 and that the valve stem from the upper end thereof down to the O-ring 56 is of substantial constant cross-section so that the O-ring 56 does not have to be stretched any more than a very slight amount when forced over the upper end of the stem and into the recess 54, as will be more fully described hereafter.

A cylindrical follower 58 is slidably disposed on the valve stem 50 below the O-ring 56 and is yieldably maintained in contact with the bottom surface thereof by a coiled spring 60 disposed on the valve stem 50 between the follower 58 and the valve element 52. The inside diameter of the follower 58 is only slightly greater than the outside diameter of the valve stem 50 so that it slides freely thereon without excessive sideways movement.

The upper end of the valve stem 50 is threaded, and threadedly disposed thereon is an elongated nut 62 and retainer member 64.

A sleeve 66 is slidably disposed on the upper portion of the valve stem 50 between the retainer member 64 and the O-ring 56, the lower end of the sleeve 66 bearing against the upper surface of the O-ring 56 so as to positively limit its upward movement when the upper end of the sleeve 66 abuts the retainer member 64. As shown more particularly in Fig. 2, the lower end of the sleeve 66 is slightly enlarged and contains a beveled side wall 68 which is formed at substantially the same angle as the beveled wall portion 40 of the upper valve port 34.

It will be noted by referring to Fig. 2 that the outside diameter of the enlarged portion at the bottom of the sleeve 66 and the outside diameter of the follower 58 are substantially the same and are slightly less than the inside diameter of the vertical wall portion 38 of the upper port 34. The O-ring 56 protrudes slightly beyond the outer periphery of the follower 58 and the outer periphery of the enlarged portion of the sleeve 66, so that when the valve assembly 48 moves upwardly the O-ring 56 will contact the tapered wall portion 40 before entering the vertical wall portion 38.

It will be apparent that the upper O-ring 56 can move downwardly relative to the valve stem 50 and the lower valve element 52, against the action of the spring 60 but that the upward movement of the O-ring 56 is positively limited by the sleeve 66 abutting the retainer member 64.

The diaphragm type motor assembly 14, which will now be briefly described, includes a cup shaped lower diaphragm housing mmeber 70 fastened to the upper end of the valve body 16. The housing member 70 contains a large central opening 72 which slidably receives the valve stem 50 and sleeve 66, and a plurality of smaller openings 74 in alignment with the upper chamber 24 which provide passageways between the interior of the housing member 70 and the upper chamber 24 of the valve body.

A convex shaped upper diaphragm housing member 76 is fastened to the lower housing member 70, and held between the two is a diaphragm 78 of conventional construction which divides the diaphragm housing into an upper diaphragm chamber 80 and a lower diaphragm chamber 82.

The diaphragm 78 is fastened to the valve stem 50 in a conventional manner by means including the retainer 64 so that the valve assembly 48 moves with the diaphragm 78 as the latter moves in response to pressure variation in the outlet chamber 28. The outlet chamber 28 is in communication with the lower diaphragm chamber 82 below the diaphragm 78, through passageway 30, the upper valve body chamber 24, and the openings 74.

The diaphragm 78 is biased downwardly primarily by a coiled spring 84, and means are provided for varying the force exerted by this spring 84.

To position the valve stem assembly 48 in the valve housing and diaphragm housing, the coiled spring 60 is first slipped downwardly over the upper end of the bare valve stem 50 until it rests on the valve element 52. The follower 58 is then slipped onto the upper end of the valve stem until it abuts the upper end of the spring 60. Thereafter the O-ring 56 is placed over the upper end of the valve stem and rolled downwardly until it is positioned in the reduced portion 54. As commented on previously, the inside diameter of the O-ring and the outside diameter of the reduced portion 54 is only slightly less than the maximum outside diameter of the valve stem 50 so that the O-ring 56 is stretched an insignificant amount while it is being rolled into position. Thereafter the sleeve 66 and retainer 64 are placed on the valve stem 50 above the O-ring 56 and the upper end of the assembly 48 inserted upwardly through the inlet chamber 18 of the valve body and into the diaphragm assembly 14. The diaphragm 78 is then fastened to the stem 50 by means including the nut 62 and the other parts which are shown but not described because they are of conventional design.

Operation

Assuming that the valve is in the open position as shown in Figs. 1 and 2, an increase in pressure in the outlet chamber 28, as caused for example by a decrease in demand, will cause the diaphragm 78 and valve stem assembly 48 to move upwardly. This is because the outlet chamber 28 is in communication with the lower diaphragm chamber 82 by means of the passageway 30, the upper valve chamber 24 and the openings 74. As the enlarged portion of the sleeve 66 approaches the tapered wall 40 of the upper valve port 34, the fluid flow through the port will be uniformly throttled because of the complementary shape of the valve port wall 40 and the tapered wall 68 of the enlarged portion of the sleeve 66.

Assuming that the distance between the parts are such that the upper O-ring 56 contacts the valve port wall 40 before the lower O-ring 42 contacts the valve element 52 whereby fluid will continue to flow into the outlet chamber 28 through the lower valve port 36 so as to urge the diaphragm 78 upwardly, either of two actions will occur, depending primarily on the magnitude of the pressure in the inlet chamber 18.

If the pressure in the inlet chamber 18 is sufficiently high, it is likely that the fluid pressure acting against the bottom surface of the upper O-ring 56 will force it into the passageway between the straight wall portion 38 of the upper valve port and the reduced portion 54 of the valve stem 50, thereby permitting the lower O-ring 42 to seat against its valve element 52.

However, if the pressure in the inlet chamber 18 is not sufficiently high to cause this previously described action to occur, the pressure acting against the bottom of the diaphragm 78 (which is caused by the fluid flow from the inlet chamber 18 through the lower valve port 36) will cause the valve stem 50 to continue to be pulled upwardly, and, because the upward movement of the upper O-ring 56 is limited by its engagement with the tapered wall portion 40 of the upper valve port, the O-ring 56 and the follower 58 will be forced downwardly against the action of the spring 60 relative to the valve stem 50. The sleeve 66 will also normally move downwardly. This downward movement of the upper O-ring 56 relative to the valve stem 50 and the valve element 52, will continue until the lower O-ring 42 seats against its valve element 52, thereby stopping the flow of fluid to the outlet chamber 28 and to the lower diaphragm chamber 82.

When the pressure in the outlet chamber 28 decreases, as upon resumed demand, the pressure in the lower diaphragm chamber 82 will also decrease and the diaphragm 78 will be forced downwardly by the spring 84, thereby moving the entire valve assembly 50 in the downward direction.

If the upper O-ring 56 had been forced upwardly into the upper valve port 34 by the action of the pressure in the inlet chamber 18 the sleeve 66 will immediately contact the upper surface of the O-ring 56 so as to force it downwardly and out of contact with the walls of the upper valve port 34.

However, if the upper O-ring is bearing against the tapered portion 40 of the upper valve port, it will be held in that position by the action of the follower 58 and spring 60, and the upper valve will remain closed until the valve stem 50 has moved downwardly a sufficient amount for the retainer 64 to contact the upper end of the sleeve 66 and cause the lower end thereof to bear upon the upper surface of the O-ring 56 and force it downwardly and out of engagement with the tapered wall 40 of the valve port.

The spring biased follower 58 bearing against the lower surface of the O-ring 56 performs another function in that the O-ring is squeezed between the upper end of the follower 58 and the lower end of the sleeve 66 so as to cause the O-ring to be slightly distended in the lateral direction. This is of particular advantage when the opening defined by the straight wall portion 38 of the upper valve port and the reduced portion 54 of the valve stem 50 is relatively large, as when there are large machining tolerances, because the enlargement of the O-ring in the transverse direction causes it to better fill and seal this valve port space.

Thus, it is apparent that there has been provided a novel O-ring mounting which fulfills all of the advantages and objects sought therefor.

The spring biased follower 58 bearing against the lower surface of the upper O-ring 56 maintains the latter in normal position when the O-ring is out of contact with its valve seat, and, at the same time permits the O-ring 56 to move downwardly relative to its supporting valve stem 50 when the occasion arises, as previously explained.

Furthermore, because the upper O-ring 56 has an inside diameter which is only slightly smaller than the maximum outside diameter of its supporting member, the valve stem 50, it can be placed thereon quickly and easily without unduly stretching and damaging the O-ring.

In addition, the force of the spring 60 bearing against the follower 58 causes the upper end of the latter to squeeze the O-ring 56 between it and the lower end of the sleeve 66 thereby causing the O-ring 56 to be extended in the lateral direction so as to better seal the upper valve port 34 when the machining tolerances are large.

It is to be understood that the foregoing description and the accompanying drawing have been given only by way of illustration and example, and that changes and alterations in the present disclosure, which will be readily apparent to one skilled in the art, are contemplated as within the scope of the present invention, which is limited only by the claims which follow.

What is claimed is:

1. In a pressure regulator containing a valve body having spaced walls with spaced aligned valve ports therein, the improvement comprising the combination of a valve stem containing a valve element adjacent one end thereof for cooperation with one of said valve ports; an O-ring for cooperation with the other valve port mounted on the valve stem in direct contact therewith in spaced relationship to said valve element and being adapted for axial movement relative to the valve stem and said valve element, the diameter of the valve stem from the end opposite to the valve element down to the O-ring being substantially no greater than the inside diameter of the O-ring whereby the latter can be slipped onto the valve stem from said opposite end without appreciable deformation of it; yieldable means between the O-ring and said one end of the valve stem retarding axial movement of the O-ring toward said one end; and removable means disposed on the valve stem unyieldably limiting movement of the O-ring in the opposite direction, both said yieldable means and said removable means defining the limit for axial movement on the valve stem of said O-ring.

2. In a pressure regulator containing a valve body having spaced walls with spaced aligned valve ports therein, the improvement comprising the combination of a valve stem containing a valve element adjacent one end thereof for cooperation with one of said valve ports; an O-ring for cooperation with the other valve port mounted on the valve stem in direct contact therewith in spaced relationship to said valve element for axial movement relative to the valve stem, the diameter of the valve stem from the end opposite to the valve element down to the O-ring being substantially no greater than the inside diameter of the O-ring whereby the latter can be slipped onto the valve stem from said opposite end without appreciable deformation of it; a follower adapted to contact said O-ring slidably disposed on the valve stem between the O-ring and said one end of the valve stem; yieldable means urging the follower against the O-ring; and removable means disposed on said other end of the valve stem unyieldably limiting movement of the O-ring toward said other end, both said yieldable means and removable means defining the limit for axial movement on the valve stem of said O-ring.

3. In a pressure regulator containing a valve body having spaced walls with spaced aligned valve ports therein, the improvement comprising the combination of a valve stem containing a valve element adjacent one end thereof for cooperation with one of said valve ports; an O-ring for cooperation with the other valve port mounted on the valve stem in direct contact therewith in spaced relationship to said valve element for axial movement relative to the valve stem, the diameter of the valve stem from the end opposite the valve element down to the O-ring being substantially no greater than the inside diameter of the O-ring whereby the latter can be slipped onto the valve stem from said opposite end without appreciable deformation of it; a follower contacting said O-ring slidably disposed on the valve stem between the O-ring and said one end of the valve stem; yieldable means urging the follower against the O-ring; and a sleeve-like member removably disposed on said other end of the valve-stem unyieldably limiting movement of the O-ring toward said other end, both said yieldable means and said removable means defining the limit for axial movement on the valve stem of said O-ring.

4. In a pressure regulator containing a valve body having spaced walls with spaced aligned valve ports therein, the improvement comprising the combination of a valve stem containing a valve element adjacent one end thereof for cooperation with one of said valve ports; an O-ring for cooperation with the other valve port mounted on the valve stem in direct contact therewith in spaced relationship to said valve element for axial movement relative to the valve stem, the diameter of the valve stem from the end opposite the valve element down to the O-ring being substantially no greater than the inside diameter of the O-ring whereby the latter can be slipped onto the valve stem from said opposite end without appreciable deformation of it; a tubular follower slidably disposed on the valve stem between the O-ring and said one end of the valve stem; a coiled spring disposed about the valve stem urging the follower against the O-ring; a sleeve-like member slidably disposed on said other end of the valve stem with one end thereof adjacent the O-ring; and removable retaining means maintaining the sleeve-like member in position so as to positively limit the movement of the O-ring toward said other end.

5. In a pressure regulator containing a valve body having spaced walls with spaced aligned valve ports therein, the improvement comprising the combination of a rod-like valve stem of substantially constant cross section throughout its length and having an enlarged valve element adjacent one end thereof for cooperation with one of said valve ports; an O-ring for cooperation with the other valve port removably disposed on the valve stem in direct contact therewith in spaced relationship with said valve element and mounted for axial movement relative to the valve stem, the portion of the valve stem receiving the O-ring being of slightly reduced cross section so as to provide a shoulder on each side of the O-ring; the diameter of the valve stem from the end opposite the valve element down to the shoulder closest thereto being substantially no greater than the inside diameter of the O-ring whereby the latter can be slipped onto the valve stem from said opposite end without appreciable deformation of it; a tubular follower slidably disposed on the valve stem between the O-ring and the enlarged valve element; a coiled spring disposed about the valve stem between the valve element and the follower urging the latter against the O-ring; a sleeve-like member slidably disposed on said other end of the valve stem with one end thereof adjacent the O-ring; and removable retaining means maintaining the sleeve-like member in position so as to limit the movement of the O-ring toward said other end.

6. In a pressure regulator containing a valve body having spaced walls with spaced aligned valve ports therein, the improvement comprising the combination of a valve stem containing a valve element adjacent one end thereof for cooperation with one of said valve ports; an O-ring for cooperation with the other valve port mounted on a reduced portion of the valve stem in direct contact therewith in spaced relationship to said valve element for axial movement in said reduced portion relative to the valve stem, the diameter of the valve stem from the end opposite to the valve element down to the O-ring being substantially no greater than the inside diameter of the O-ring whereby hte latter can be slipped onto the reduced portion of the valve stem from said opposite end without appreciable deformation of it; yieldable means between the O-ring and said one end of the valve stem retarding axial movement of the O-ring toward said one end; and a sleeve-like member removably disposed on said other end of the valve stem and axially slidable thereon unyieldably limiting movement of the O-ring to a preselected adjustable position in the opposite direction with both said yieldable means and said sleeve-like member defining the limits of axial movement of said O-ring.

7. In a pressure regulator containing a valve body having spaced walls with spaced aligned valve ports therein, the improvement comprising the combination of a valve stem containing a valve element adjacent one end thereof for cooperation with one of said valve ports; an O-ring for cooperation with the other valve port mounted on a reduced portion of the valve stem in direct contact therewith in spaced relationship to said valve element for axial movement in said reduced portion relative to the valve stem, the diameter of the valve stem from the end opposite to the valve element down to the O-ring being substantially no greater than the inside diameter of the O-ring whereby the latter can be slipped onto the reduced portion of the valve stem from said opposite end without appreciable deformation of it; yieldable means between the O-ring and said one end of the valve stem retarding axial movement of the O-ring toward said one end; and a sleeve-like member removably disposed on said other end of the valve stem and axially slidable thereon unyieldably limiting movement of the O-ring to a preselected adjustable position in the opposite direction with both said yieldable means and said sleeve-like member defining the limits of axial movement of said O-ring; and means for moving said valve stem with respect to said sleeve-like member, said means being further adapted to cause said yieldable means to force said O-ring against the sleeve-like member to distend the O-ring toward a firm seating engagement with said other valve port.

8. In a pressure regulator containing a valve body having spaced walls with spaced aligned valve ports therein, the improvement comprising the combination of a valve stem containing a valve element adjacent one end thereof for cooperation with one of said valve ports; an O-ring for cooperation with the other valve port mounted on the valve stem in direct contact therewith in spaced relationship to said valve element and being adapted for axial movement relative to the valve stem and said valve element, the diameter of the valve stem from the end opposite the valve element down to the O-ring being substantially no greater than the inside diameter of the O-ring whereby the latter can be slipped onto the valve stem from said opposite end without appreciable deformation of it; yieldable means between the O-ring and said one end of the valve stem retarding axial movement of the O-ring toward said one end; and removable means disposed on the valve stem unyieldably limiting movement of the O-ring in the opposite direction, both said yieldable means and said removable means defining the limit for axial movement on the valve stem of said O-ring; and means for moving said valve stem with respect to said removable means, said means being further adapted to cause said yieldable means to force said O-ring against the removable means to distend the O-ring toward a firm seating engagement with said other valve port.

References Cited in the file of this patent

UNITED STATES PATENTS

| | | |
|---|---|---|
| 583,366 | Foster | May 25, 1897 |
| 941,760 | Cordley | Nov. 30, 1909 |
| 952,416 | Chase | Mar. 15, 1910 |
| 2,574,054 | Miller | Nov. 6, 1951 |
| 2,599,997 | Iannelli | June 10, 1952 |

FOREIGN PATENTS

| | | |
|---|---|---|
| 40,549 | Germany | Aug. 26, 1887 |